Nov. 3, 1970
C. K. MOSS
3,538,431
GEOPHYSICAL PROSPECTING WITH SUBSURFACE
PROPAGATED ELECTROMAGNETIC WAVES
Filed Sept. 26, 1968
3 Sheets-Sheet 1
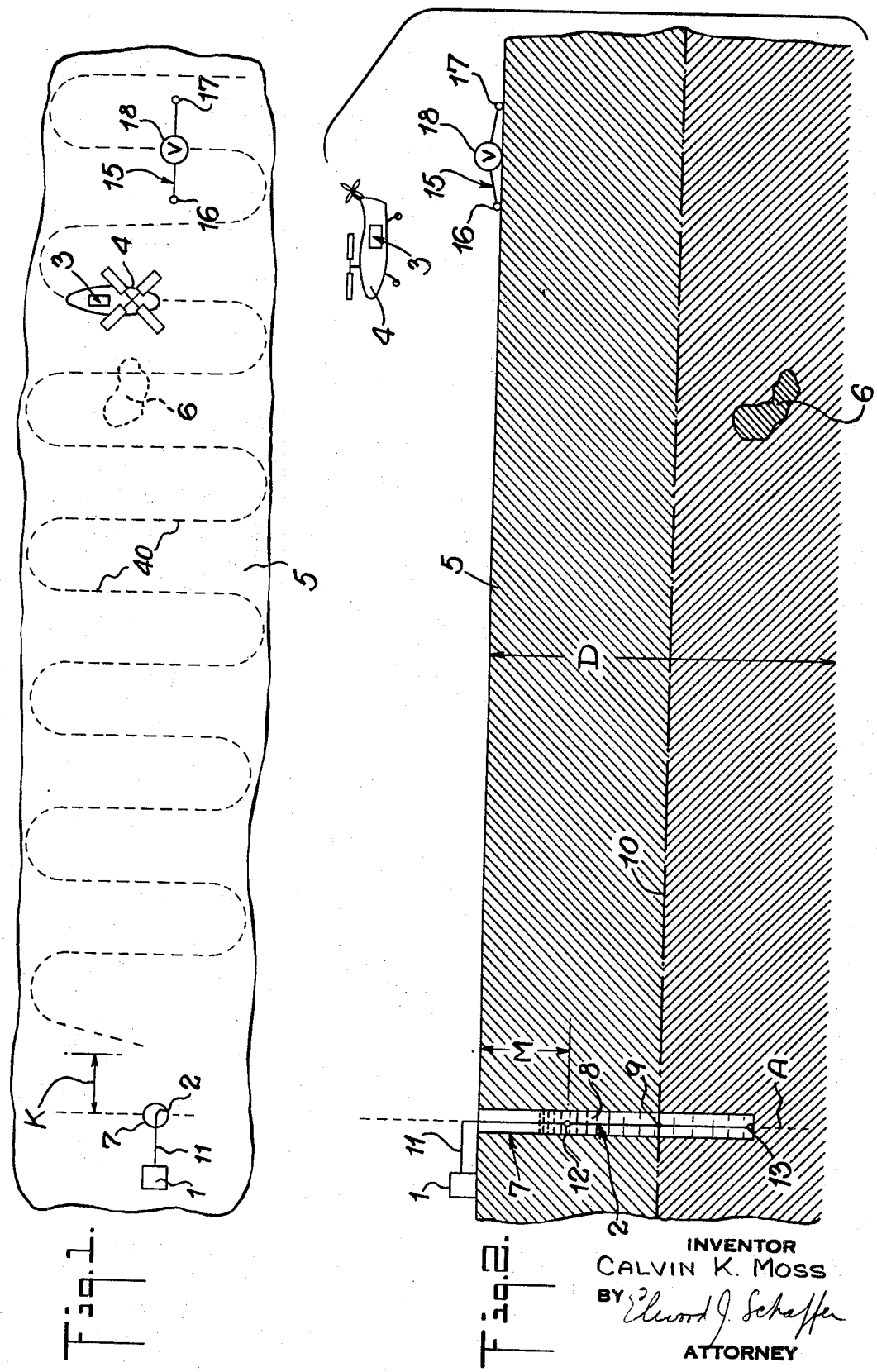
INVENTOR
CALVIN K. MOSS
BY Elwood J. Schaffer
ATTORNEY INVENTOR
CALVIN K. MOSS
BY Elwood J. Schaffer
ATTORNEY United States Patent Office 3,538,431
Patented Nov. 3, 1970

3,538,431
GEOPHYSICAL PROSPECTING WITH SUBSURFACE PROPAGATED ELECTROMAGNETIC WAVES
Calvin K. Moss, North Salt Lake City, Utah, assignor to American Smelting and Refining Company, New York, N.Y., a corporation of New Jersey
Filed Sept. 26, 1968, Ser. No. 762,815
Int. Cl. G01v 3/12
U.S. Cl. 324—6                    6 Claims

ABSTRACT OF THE DISCLOSURE

Geophysical prospecting by transmitting electromagnetic waves from an electric dipole antenna disposed wholly and substantially vertically in a drill hole, the transmitted waves possessing sufficient energy to produce at the earth surface in the area to be prospected a primary electromagnetic field having a detectable horizontal electrical component, moving a receiver for receiving electromagnetic waves having a frequency in the range of the transmitted waves to a plurality of points in an area to be prospected and measuring the electromagnetic field produced at said points by the electromagnetic waves received by the receiver.

BACKGROUND OF THE INVENTION

Field of the invention

This invention relates to geophysical prospecting for geological anomalies and more particularly to a method of geophysically prospecting by measuring the electromagnetic field established by an excited anomaly.

Description of the prior art

Heretofore many attempts have been made to detect subterranean deposits by electromagnetic field measurements. Thus, in one process, a transmitter is placed on one wing tip and a receiver on the other wing tip of a monoplane type of airplane and variations in the magnetic field at the receiver are measured while transmitting from the transmitter and flying the plane over an area to be prospected. In another process, a relatively small aboveground transmitter is carried into the field on the back of one person in an exploration party and a relatively small receiver on the back of another person in the party; measurements being made on the receiver during transmissions from the transmitter while both transmitter and receiver are stationary and disposed relatively close to each other, i.e. within a distance of aproximately 2000 feet of each other. Attempts have also been made to locate deposits by measuring changes in the natural electromagnetic noise in the earth's magnetic field.

The prior art procedures are characterized by a number of disadvantages. Thus, for example, such procedures possess one or more important disadvantages such as non-reproducible and unreliable results, extreme complexity in interpreting the obtained data in terms of subterranean geology, and shallow penetration of the earth. One of the advantages of the present invention is that it overcomes such disadvtanges of the prior art. Another extremely important advantage is that the invention affords a procedure for detecting subterranean anomalies which are disposed more than 100 feet and up to more than 1000 feet and as much as several miles or more below the surface of the earth. These and other advantages will become apparent from the following description of the invention.

SUMMARY OF THE INVENTION

Broadly, the invention comprehends a method of geophysicaly prospecting for subterranean geological anomalies which comprises directing electromagnetic waves into the earth without producing a primary electromagnetic field having a substantial magnetic component at the earth surface in the area to be prospected, said waves possessing sufficient energy to produce at said earth surface a primary electromagnetic field having a detectable horizontal electrical component, moving a receiver for receiving electromagnetic waves having a frequency in the range of said directed waves to a plurality of points in an area to be prospected, and measuring the electromagnetic field produced by electromagnetic waves received at said points, thereby to determine the presence of subterranean geological anomalies in the area to be prospected.

The feature of directing electromagnetic waves into the earth without producing a primary electromagnetic field having a substantial magnetic component at the earth surface is an important feature of the invention. Any suitable transmitter provided with any suitable antenna may be employed to direct the primary waves into the earth. An important advantage of the invention is that it permits the target or secondary field to be measured at the earth surface without substantial interference by the primary field thereby affording reliable and reproducible results while avoiding complexity in interpretation of the obtained data, in terms of subterranean geology. It also permits detection of anomalies that would otherwise not be detected in the absence of the invention. It will be understood that a primary electromagnetic field is the electromagnetic field produced at a receiver by those of the primary electromagnetic waves (i.e. the electromagnetic waves generated by a transmitter and directed into the ground by an antenna) that have reached the receiver. It will also be understood that a target field is the electromagnetic field produced at the receiver when detectable secondary electromagnetic waves (i.e. electromagnetic waves emitted by a subterranean geological anomaly which has been excited by the primary waves introduced into the anomaly either directly or indirectly from a transmitter antenna) reach the receiver. Appropriate disposition of the antenna for directing the waves into the earth in accordance with the invention may be determined in a conventional manner. Presently it is preferred to make such determination by drilling a hole in the earth in the area to be prospected and lowering a receiver for measuring the magnetic elements of the primary field into the hole. Disposition of the antenna in accordance with the invention is indicated if any magnetic component of the primary field exists and increases in intensity as the depth of the receiver in the hole is increased.

In another aspect of the invention, and most advantageously, the primary waves are directed into the earth from an electric dipole antenna disposed wholly below the surface of the earth and also substantially vertically therein. An electric dipole antenna thus disposed in the earth directs the electromagnetic waves into the earth without producing a primary electromagnetic field having a substantial magnetic component at or above the earth surface in the area to be prospected. In accordance with this aspect, the invention comprehends a method of geophysical prospecting by transmitting elecromagnetic waves from an electric dipole antenna disposed wholly and substantially vertically below the surface of the earth, the waves possessing sufficient energy to produce at the earth surface in the area to be prospected a primary electromagnetic field having a detectable horizontal electrical component, moving a receiver for receiving electromagnetic waves having a frequency in the range of the transmitted waves to a plurality of points in an area to be prospected and measuring the electromagnetic field produced at said points.

It will be understood that such antenna is disposed substantially vertically when a line passing through the center of the antenna poles is substantially vertical; and, that such antenna is disposed wholly below the surface of the earth when the uppermost pole of the substantially vertical antenna is disposed at or below the surface of the earth. In disposing the dipole antenna below the surface of the earth, the antenna may be buried in the ground or the antenna may be placed in a drill hole or mine shaft or otherwise disposed below the surface of the earth, with the poles preferably in direct physical contact with the ground or, more preferably, in direct electrical contact with the ground, such as for example, by means of a suitable fluid electrolyte, such as for example water or a weak solution of brine, contained in the drill hole or shaft in amounts sufficient to submerge the poles of the antenna.

The electromagnetic waves may be propagated in any form of varying electromagnetic energy which may vary continuously or intermittently. Preferably the waves are conventional alternating electromagnetic waves. Preferably also the alternating waves are controlled (or ordered) waves as opposed to waves possessing random amplitude or random wave lengths. Thus, the wave length and amplitude of such preferred waves transmitted while making the measurements of the electromagnetic field in the area to be prospected, may be constant or substantially constant or confined to a range or either or both the wave length or amplitude may be controlled to possess ordered variations which may have a regular or irregular pattern. Preferably, in practicing the invention, the alternating waves that are employed have a frequency of alternation which is dependent upon the depth below the earth surface to which it is desired to detect anomalies in conducting the prospecting. Preferably the alternating electromagnetic waves have a frequency which is below the frequency which is represented by the value F in the equation:

$$F = \frac{6,000,000}{D^2} R$$

wherein F is frequency in cycles per second, D is the depth in meters below the earth surface to which it is desired to conduct prospecting to detect anomalies and R is the average resistivity of the earth in ohm-meters between the earth surface and the depth D in the area to be prospected. Preferably also, the frequency is at least 1 cycle per second and more preferably at least 10 cycles per second. Frequencies below the frequency of F in the foregoing equation and in the range of 100 to 5000 cycles per second are most preferred since they provide an especially favorable relationship between strength of signal and natural noise level; and, within such frequencies, alternating electromagnetic waves having a frequency in the range of 400 to 3000 cycles per second are preferred in practicing the invention for relatively short range prospecting—as for example ranges less than about five mile from the situs at which the waves are directed into the earth. In general a frequency of approximately 400 cycles per second is most preferred. The average resistivity R of the foregoing equation may be determined by the Conventional Wenner procedure and arrangement of electodes using an electrode spacing which is twice the depth D; the Wenner procedure and arrangement being described in the textbook "Introduction to Geophysical Prospecting" by M. B. Dobrin, 1952 edition, pages 295–297, published by McGraw-Hill Book Company.

The foregoing equation is illustrated by the following example:

To prospect for anomalies lying within an earth depth of 1000 meters in earth having an average resistivity of 500 ohm-meters, the frequency of the electromagnetic waves directed into the ground while measuring the electromagnetic field in the area to be prospected, preferably should not exceed F in the equation:

$$F = \frac{6,000,000 \times 500}{1000^2} = 3000 \text{ cycles per second}$$

The equation is further illustrated by the following example:

To prospect for anomalies lying within an earth depth of 750 meters in earth of the same 500 ohm-meters resistivity, the frequency preferably should not exceed F in the equation:

$$F = \frac{6,000,000 \times 500}{750^2} = 5,333 \text{ cycles per second}$$

In practicing the invention, sufficient energy (amplitude) is imparted to the waves directed into the earth to produce, at the earth surface in the area to be prospected, a primary electromagnetic field having a detectable horizontal electrical component, i.e. a component having sufficient signal strength to identify the frequency of the signal. Preferably the waves possess sufficient energy to produce a measurable horizontal electrical component, i.e. a component having a signal strength sufficient to determine the amplitude as well as the frequency of the signal. It will be understood that such horizontal electrical component can be measured conventionally by measuring the voltage generated in a dipole receiving antenna disposed with both ploes in contact with the earth surface in the area to be prospected. It will also be understood that the primary waves directed into the earth may be identified as the source of such primary field by comparing the frequency of the primary waves with that of such horizontal electrical component, as for example, by comparing the frequency of such component with the frequency of a local oscillator which is oscillated at the same frequency as that of the waves directed into the ground.

The range of the prospecting in practicing the invention (i.e. the distance between the situs at which the primary waves are injected into the earth and the receiver) may be any distance so long as the waves possess sufficient energy to provide the foregoing primary field having detectable horizontal electrical component at the earth surface. In order to avoid unduly large power requirements when long ranges in excess of about two miles and especially when long ranges in excess of five miles are desired, the antenna employed to direct the primary waves into the ground is disposed sufficiently deep in the ground so that the center of the antenna is disposed in earth having a resistivity (i.e. specific resistance) of at least 100,000 ohm-meters. (It will be understood that, in general, the resistivity of the earth increases with depth). When the primary waves are directed into the ground from an electric dipole type antenna, the energy that can be released into the ground increases with the dipole length (i.e. the distance between the poles of the antenna). For this reason, especially when long ranges are employed, such dipole length is preferably as great as practicable. Preferably, taking into consideration size and power requirements of the transmitter, long ranges less than approximately 50 miles and preferably long ranges less than approximately 25 miles are employed. Preferably, when the center of the antenna is disposed relatively shallowly in the ground (i.e. at a level at which the resistivity of the earth is less than 100,000 ohm-meters), short or relatively short propecting ranges are employed which preferably do not exceed approximately 5 miles and more preferably do not exceed approximately 2 miles. The resistivity of the earth at a given depth level (specific resistance) may be determined in any conventional manner. For example, such resistivity may be, and presently preferably is, determined by the procedure disclosed on pages 382 to 385 in the textbook "Geophysical Prospecting For Oil' by L. L. Nettleton, 1940 edition, published by McGraw-Hill Company.

In addition to detecting the existence of an anomaly or anomalies in an area to be prospected, the invention is advantageously employed in delineating an anomaly detected or known to be present in such area; and, for purposes of this specification and the claims, detection and delineation of an anomaly are included in the scope of the invention in conducting geophysical prospecting to determine the presence of subterranean geological anomalies. In employing an electric dipole transmitting antenna in prospecting operations conducted to delineate an anomaly known to be present or for any reason believed to be present it is preferred, especially when short ranges are involved, to dispose the antenna at a level in the earth such that at least half, more preferably at least three-quarters and most preferably substantially all of the antenna is below the anomaly. Preferably, in practicing the invention and especially when practicing the invention to delineate an anomaly, the antenna is disposed in a drill hole with the lowermost pole disposed at the bottom of the hole. Preferably also, in delineating an anomaly, the drill hole is drilled so as to pass through the anomaly especially when the latter is an ore body. Also, in delineating an ore body by such preferred procedure, the antenna is preferably disposed in the drill hole with the upper pole of the antenna in contact with the ore body at the level of the latter.

Measurements of the electromagnetic field in the area to be prospected may be made in any desired manner with an appropriate receiver. Thus, for example, measurements may be made at a plurality of points on the earth surface in the area to be prospected by moving the receiver to such points and making the measurements at each point while the receiver is stationary. In the preferred procedure, the measurements are made above the earth surface in such area, especially when the preferred electric dipole antenna is employed in practicing the invention. In such preferred procedure, the receiver may be carried above ground in any appropriate manner and the measurements may be made while the receiver is moving or is stationary. Preferably, in such preferred procedure, the measurements are made while the receiver is moving and preferably while being carried in an airplane or helicopter. In order to obtain data which can be interpreted with relative ease in terms of subterranean geology when employing an electric dipole transmitting antenna disposed substantially vertically and wholly below the earth surface, measurements of the electromagnetic field in the area to be prospected are made at a plurality of points spaced from a line passing through the poles of the antenna by a distance which is greater than 200 feet but which is also more than one-half of the distance between the upper pole of the antenna and the earth surface. Preferably such points of measurement are more than 300 feet and, more preferably, more than 400 feet from said line. The invention may also be practiced by measuring the field at or above the earth surface in a mine chamber or cave or other cavity in the earth.

In practicing the invention, the field at the receiver may be measured in any appropriate manner. Advantageously, field measure is made by measurements determining any one or more of all of the following magnetic elements of the field, although alternatively the corresponding electrical elements of the field or such electrical elements in combination with such magnetic elements may also be measured if desired: either or both the amplitude or direction of any of the three orthogonal components of the magnetic vector of the field; either or both the amplitude or direction of any one or more of the resultants of such three orthogonal components, which lie in the three orthogonal planes containing such three components; the magnetic vector per se; and change of phase between any of such components or resultants or such components, or change of phase in any one of such components or resultants of such components as compared to a reference which may be the transmitter itself but which is preferably a local oscillator oscillating at the same frequency as the transmitter. Of such magnetic measurements, it is more preferred to measure the amplitude and direction of the horizontal components or the resultant of the horizontal components of such magnetic vector, or such change in phase in any of the components or resultants of such magnetic components. When convenience and costs are not important considerations, it is preferred, at present, to measure said three orthogonal components of the magnetic vector of the field at the receiver together with changes in phase in each of said three components. However, for greatest convenience and economy in practicing the invention, it is, at present, most preferred to measure the resultant of the horizontal components of the magnetic vector of the field at the receiver. It will be understood that, in practicing the present process, a resultant can be measured directly or it may be measured indirectly by measuring its components; and, that components can likewise be measured directly or they may be measured indirectly by measuring their resultant.

It will also be understood that, in measuring the electromagnetic field in accordance with the invention, changes in magnitude of the measurements are especially reliable indications of the presence of an anomaly. Accordingly, in practicing the invention, the field is measured at a plurality of points in the area to be prospected to determine the presence of anomalies. Moreover, in measuring the field at such plurality of points, the specific character of the changes in amplitude and direction of the magnetic vector of the field, or of its components or of the horizontal or vertical resultants of its components, are indicative of the depth of the geological anomaly. Practice of the invention determines the presence of underground geological anomalies having different electrical properties from those of the surrounding earth, especially anomalies having higher conductivities than the surrounding earth such as, for example, conductive ore deposits, faults, shear zones, saline waters and other conductive geological phenomena. The invention is particularly advantageous in determining the presence of conductive underground anomalies representative of subterranean ore deposits, and especially conductive sulfide mineral deposits.

A transmitter of any appropriate capacity and construction may be used in practicing the invention; and, the antenna therefor may have any suitable configuration. Thus, for example, the transmitter antenna may be loop type or dipole type construction. As indicated earlier however, a dipole type transmitting antenna is most advantageous. The invention may be practiced with the transmitter and its antenna disposed in a single location or in a plurality of locations to prospect in a desired area. A receiver of any appropriate construction, and sensitivity may likewise be used in practicing the invention. For example, in measuring an electrical element of a field with a moving receiver, the receiver may comprise a condenser, one of the plates of which is a conventional antenna and the other plate being a means serving as a ground. Such receiving antenna may be a conventional rod antenna and the ground means may be the earth or it may be the metal surface of a helicopter or other suitable means when the receiver is being flown above ground while making field measurements. In measuring the various aforementioned aspects of the magnetic vector of a field, a conventional coil type receiver is preferred; the area of the coil and the number of its turns being selected to afford the desired sensitivity in the receiver.

The invention is further illustrated in the accompanying drawings and examples. It should be understood, however, that the drawing and examples are given for purposes of illustration and that the invention in its broader aspects is not limited thereto.

BRIEF DESCRIPTION OF THE DRAWINGS

In the drawings:

FIG. 1 is a plan view, diagrammatic in nature, illustrating the preferred embodiment for practicing the invention for long range prospecting.

FIG. 2 is a side view of the embodiment illustrated in FIG. 1.

DESCRIPTION OF THE PREFERRED EMBODIMENTS

Figure 3:
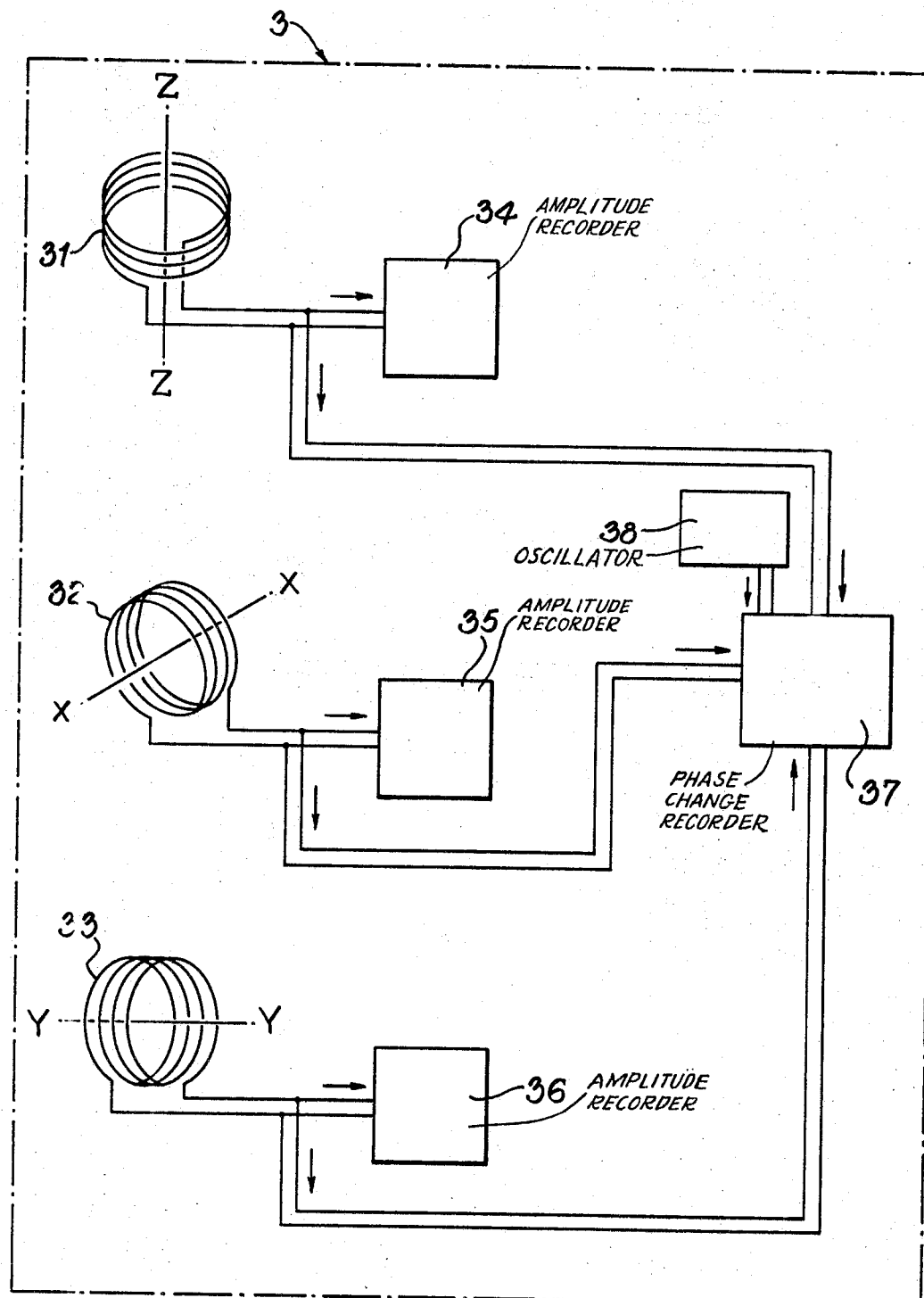
FIG. 3 is a partially perspective view diagrammatic in nature, illustrating the preferred receiver for practicing the invention.

In the drawings, like numerals refer to like elements or members. Referring now to FIGS. 1 and 2 of the drawings, the numeral 1 represents a conventional transmitter provided with antenna 2 for generating and directing primary electromagnetic waves into the earth for prospecting for anomalies disposed within distance D in the earth. The nmeral 3 represents a receiver for receiving secondary waves generated by an anomaly when the latter is excited by the primary waves reaching it; the receiver being shown mounted in helicopter 4 which is navigated over the earth over area 5 in prospecting for anomaly 6. The output end of transmitter 1 is coupled to antenna 2 by means of insulated cable 11. Antenna 2 is disposed in drill hole 7 and is insulated along its length to shield it from the earth. The electrodes 12 and 13 constituting the two poles of electric dipole of antenna 2 are grounded to the earth as by filling the drill hole with water 8, to a level above the upper pole 12. The center 9 of antenna 2 is at a depth in the earth at which the earth resistivity is 100,000 ohm-meters, represented by the line 10. Line A passing through electrodes 12 and 13 is disposed vertically.

In operating the transmitter assembly, alternating electric current from transmitter 1 is passed through cable 11 to antenna 2 to produce and direct electromagnetic waves into the earth; the frequency of the waves corresponding to the frequency of the alternating current passed to the antenna. The frequency of the alternating current is selected to provide electromagnetic waves having a frequency in accordance with the invention, which as hereinbefore described is dependent upon the depth D below the earth surface to which it is desired to detect anomalies. Also, the amperage of the alternating current is selected to provide waves of sufficient amplitude to produce a primary field having a detectable, and preferably a measurable, horizontal electrical component where secondary field measurements are to be made with receiver 3 in area 5. Such horizontal electrical component may be measured by dipole receiving antenna 15 having its two electrodes 16 and 17 in electrical contact with earth and being provided with voltmeter 18. In practice, when the electromagnetic waves possess sufficient energy to produce a primary field having a detectable horizontal electrical component, the voltmeter 18 will indicate a detectable voltage and when a measurable horizontal electrical component is present a measurable voltage is produced in the voltmeter. If desired for convenience in practice, the horizontal electrical component may be determined only once at the farthest distance from antenna 2 at which the secondary field is to be measured.

As illustrated in FIG. 3, the receiver 3 is a receiver for measuring the electromagnetic field at the receiver. The latter is provided with coils 31, 32 and 33 for receiving electromagnetic waves in three orthogonal planes. Said coils are mounted in the helicopter with their axes (Z, X and Y respectively) disposed normal to each other and also with the axis Z of coil 31 disposed substantially vertically and the axis Y of coil 33 aligned with the longitudinal axis of the helicopter, when the helicopter is in position for measuring the signals received by the receiver. The coils 31 through 33 are connected to conventional measuring instruments 34 through 36, respectively, for measuring and recording the amplitudes of the signals from the coils; and each of the coils is also connected to a conventional measuring instrument 37 for measuring and recording changes in phase of the signals received from the coils as compared to local reference oscillator 38 which is oscillated at the same frequency as the transmitter. If desired, only one of the coils may be used when only one component of the magnetic vector is to be measured; or any two of the coils may be used if it is desired to measure two components of the magnetic vector or if it is desired to measure the resultant of any two of such components. Also, if desired, measurement of change of phase may be dispensed with or the change of phase of the signal from one or more or all of the coils may be measured.

Figure 4:
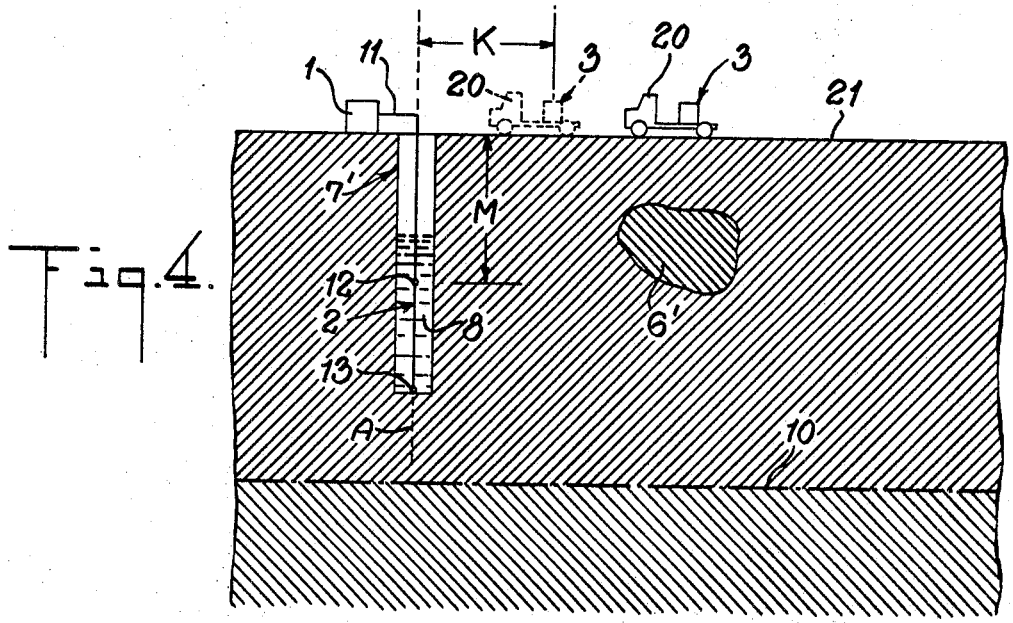
FIG. 4 is a plan view, diagrammatic in nature, illustrating an embodiment for practicing the invention in short range prospecting.

In the short range prospecting procedure illustrated by FIG. 4, the bottom of the drill hole 7' is disposed above the level 10 in the earth at which the earth resistivity is 100,000 ohm-meters. The receiver 3 is mounted on truck 20 and is moved about the area to be prospected; the truck being stationary while measurements of the electromagnetic field are being made. In accordance with the invention, measurements are made at a plurality of points spaced from a line A passing through the poles of antenna 2 by a distance which is greater than K, the latter distance being not less than one-half the distance M between pole 12 of the antenna 2 and the earth surface 21 but not less than 200 feet and preferably, as indicated earlier, not less than 300 feet and more preferably not less than 400 feet.

Figure 5:
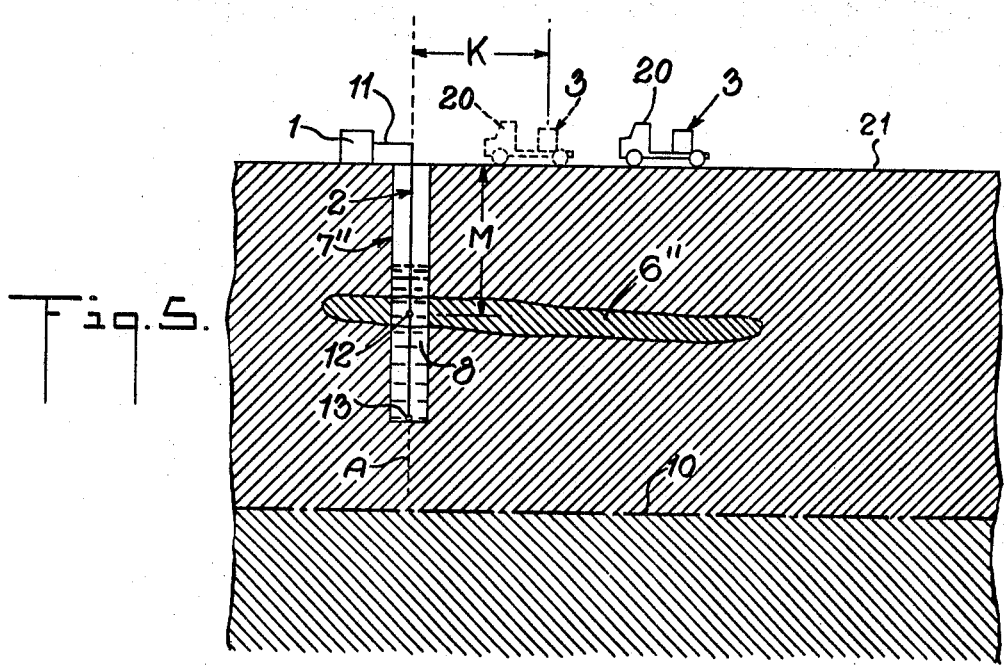
FIG. 5 is a view similar to FIG. 4 for practicing the invention in short range prospecting with the drill hole passing through an ore body.

In the short range prospecting procedure illustrated by FIG. 5, the drill hole 7" passes through anomaly 6" shown as an elongated ore body. As shown, the upper electrode 12 of antenna 2 is in direct contact with the ore body and the lower electrode 13 is disposed at the bottom of the drill hole 7" so that substantially all of the antenna is below the anomaly. In practicing the procedure illustrated in FIG. 5 to delineate the anomaly, the electromagnetic field is measured at a sufficient number of points with receiver 3 to indicate the extent and depth of the anomaly.

In practicing the procedure illustrated in FIGS. 1 and 2, helicopter 4 carrying a receiver 3 (shown in FIG. 3) is navigated over path 40 in any appropriate manner so that its course (heading) and its height and position with respect to the ground in area 5 as well as with respect to drill hole 7 and antenna 2 therein, are known when signals from the coils 31 through 33 are measured and recorded on instruments 34 through 37. Oscillator 38 is oscillated at the same frequency as the frequency of the primary waves directed into the ground from antenna 2. Electromagnetic field measurements are made at a plurality of points on path 40 in area 5 while the helicopter is navigated on path 40 at a known speed and altitude and a known course for a known time from a known starting point so as to correlate the position of the coils and the azimuth of the axes X and Y of coils 32 and 33 respectively, with the signals from the three coils when such signals are being measured and recorded on instruments 34 through 38. In practicing the procedure illustrated in FIGS. 4 and 5, the field measurements are made at a plurality of points of known position in the area to be prospected while the receiver 3 is stationary and the axis of coil Z is disposed substantially vertically. In making such field measurements, the azimuth of coils X or Y during the measurements is also determined at each point. Likewise the distance of the points from the drill hole and the bearing of the drill hole from the point being measured is also determined.

EXAMPLE 1

Practice of the invention for long range prospecting in earth having an average resistivity of about 500 ohm-meters is illustrated by the following procedure. Drill hole 7 is drilled substantially vertically and sufficiently deep in the earth so that its bottom is disposed at a position which is at least one-half of the length between the electrodes of antenna 2, below the level in the earth at which the earth resistivity (specific resistance) is at least 100,000 ohm-meters, as shown in FIGS. 1 and 2. Antenna 2 is placed in the drill hole with its lower electrode at the bottom of the hole and with the center 9 of the antenna at a depth in the earth at which the earth resistivity is at least 100,000 ohm-meters. Electromagnetic waves having a frequency of 400 cycles per second are generated and directed into the ground by means of transmitter 1 and antenna 2. The waves are generated with sufficient energy to produce a primary electromagnetic field which has a horizontal electrical component which can be measured by the voltmeter 18 of receiving dipole antenna 15; such receiving antenna being disposed in the area 5 to be prospected at the greatest distance from drill hole 7 at which secondary field measurements are to be made. Helicopter 4 is navigated over path 40 (all of said path being within 50 miles of drill hole 7) in the manner described earlier herein in connection with FIGS. 1 and 2 so that the helicopter's course and its height and position which respect to the ground in area 5 are known when signals from coils 31 through 33 are measured and recorded in instruments 34 through 37. Oscillator 38 is oscillated at a frequency of 400 cycles per second while making such measurements. Measurements are made at a plurality of points on path 40 at a distance greater than K from line A; the distance K being greater than 200 feet and not less than one-half the distance M between the top electrode 12 and the surface of the ground. The magnitude and direction of the magnetic elements at the receiver and their phase as compared to the phase of oscillator 38, at the various measuring points are measured and recorded and the measurements are noted on a map of area 5. Differences between the various measuring points in the values of the measurements plotted on the map indicate the presence of an anomaly; and the magnitude and direction of the magnetic elements at the measuring points or changes in the values of the magnitude and direction of such elements between measuring points indicate the location and depth of the anomaly. Subterranean anomalies in area 5 which are disposed in the earth up to 1000 feet or more and at distances up to 5 miles and as much as within fifty miles from drill hole 7 are detected.

EXAMPLE 2

Practice of the invention for short range prospecting in earth having an average resistivity of 500 ohm-meters is the same as the procedure of Example 1 except that the drill hole is more shallow as shown in FIG. 4, measurements of the secondary electromagnetic field are made at a plurality of points within five miles of drill hole 7, receiver 3 is mounted on truck 20 and the field measurements are made while the receiver is stationary. Anomalies in area 5 which are disposed in the earth up to 1000 feet and more and at distances up to 2 miles and as much as within 5 miles from drill hole 7' are detected.

EXAMPLE 3

Practice of the invention for short range prospecting in earth in which the drill hole passes through the anomaly is the same as the procedure of Example 2 except that the upper electrode of antenna 2 is preferably in direct contact with the anomaly and a plurality of field measurements are made in a patterned area straddling the anomaly. Such measurements of the patterned area are plotted on a map of the area. Such plot indicates the disposition, extent and depth of anomaly.

In practicing the invention, various modifications may be made in the foregoing procedure without departing from the essential principles of the invention, which is extended to be limited only by the scope of the appended claims.

What is claimed is:

1. A method of geophysically prospecting for subterranean geological anomalies which comprises transmitting primary electromagnetic waves from an electric dipole antenna disposed wholly and substantially vertically below the surface of the earth thereby directing said primary waves into the earth without producing a primary electromagnetic field having a substantial magnetic component above the earth surface anywhere in the area to be prospected, said waves possessing sufficient energy to produce at the earth surface in the area to be prospected a primary electromagnetic field having a detectable horizontal electrical component, said waves being alternating electromagnetic waves having a frequency which is in the range of 1 to 5000 cycles per second and which is below the frequency which is represented by the value of F in the equation:

$$F = \frac{6,000,000}{D^2} R$$

wherein F is frequency in cycles per second, D is the depth in meters below the earth surface to which prospecting is to be conducted to detect anomalies in said area and R is the average resistivity of the earth between the earth surface and depth D, moving a receiver for receiving electromagnetic waves have a frequency in the range of said primary waves to a plurality of points distributed above the earth surface throughout the area to be prospected and spaced from a line passing through the poles of said dipole antenna by a distance which is greater than 200 feet and which distance is also more than one-half of the distance between the upper pole of said antenna and the earth surface, and measuring the electromagnetic field produced by electromagnetic waves received at said points while transmitting said primary waves and maintaining said dipole antenna stationary, thereby to determine the presence of subterranean geological anomalies in said area to be prospected.

2. A method according to claim 1 in which the center of said dipole antenna is disposed in the earth at a depth at which the earth's resistivity is at least 100,000 ohm-meters.

3. A method according to claim 2 in which said receiver is flown above ground over said area while making said measurements at said points.

4. A method according to claim 1 in which said receiver is stationary while making said measurements at said points.

5. A method according to claim 1 in which an ore body is delineated and in which the dipole antenna is disposed with at least half of its length below the ore body to be delineated.

6. A method according to claim 5 in which the antenna is disposed in a drill hole passing through the ore body to be delineated, the upper pole of the antenna is in contact with said ore body and the lower pole of the antenna is disposed at the bottom of the drill hole.

References Cited

UNITED STATES PATENTS

| Number | Date | Name | Class |
|---|---|---|---|
| 2,268,106 | 12/1941 | Blau | 324—6 |
| 3,065,408 | 11/1962 | Marsh | 324—6 |
| 1,676,779 | 7/1928 | Herr | 324—6 |
| 1,792,910 | 2/1931 | Jakosky | 324—6 |
| 2,653,220 | 9/1953 | Bays. | |
| 2,992,325 | 7/1961 | Lehan | 324—6 XR |
| 3,036,265 | 5/1962 | Ghose | 324—6 |
| 3,123,767 | 3/1964 | Ghose | 324—6 |

GERARD R. STRECKER, Primary Examiner